June 13, 1944. J. G. HAWLEY 2,351,040
POWER UNIT
Filed May 24, 1940 2 Sheets-Sheet 1
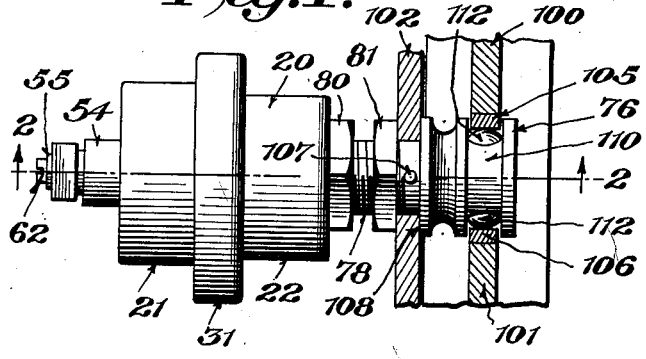
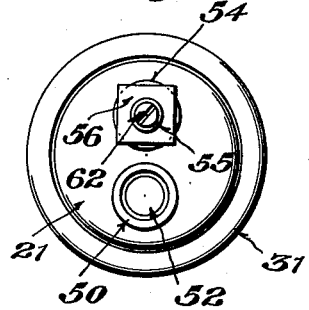
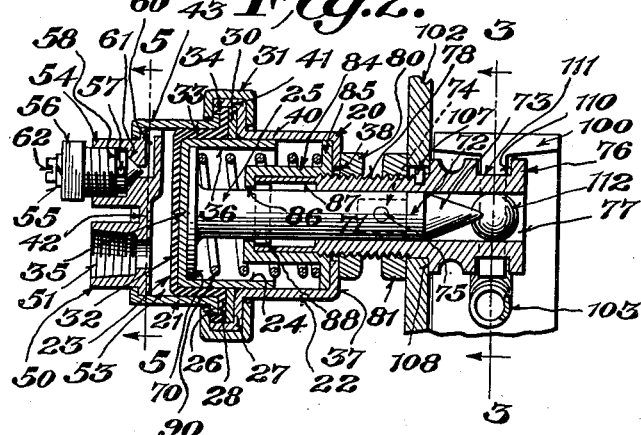
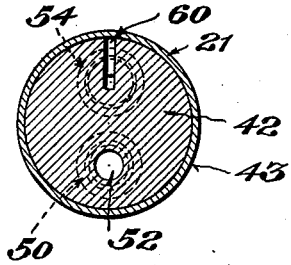
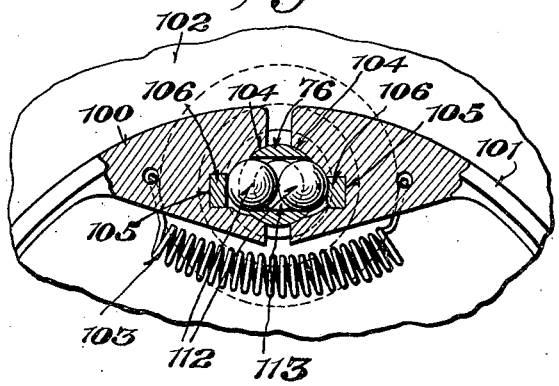
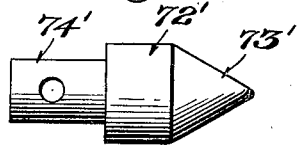
Inventor
Jesse G. Hawley,
By Albert T. St Clair
Attorney Inventor
Jesse G. Hawley,
By Albert T. St Clair
Attorney Patented June 13, 1944

2,351,040

UNITED STATES PATENT OFFICE 2,351,040

POWER UNIT

Jesse G. Hawley, Painted Post, N. Y.

Application May 24, 1940, Serial No. 337,102

6 Claims. (Cl. 188—152)

This invention relates to the art of power units, and more particularly to hydraulically operated devices for imparting motive power.

While many devices have been developed for actuating moving parts, these have generally been adapted for operating some particular type of mechanism and have lacked general utility as a power unit. Furthermore, most such devices, which possess any degree of interchangeability, have generally been of complicated construction, and this is particularly true of the fluid-operated devices.

I have found that it is possible to produce a simple and inexpensive power unit of general utility and to operate it selectively by hydraulic or mechanical means.

It is therefore an object of this invention to provide a new and improved power unit.

It is another object to provide a hydraulically operated power unit.

It is a further object to provide a power unit which may be operated either hydraulically or mechanically.

It is an additional object to provide a sealed power unit.

It is also an object to provide a simple and inexpensive power unit of general utility.

It is a special object to provide a power unit for actuating braking devices.

With the above and other objects in view, which will be apparent as the description proceeds, I have set forth my invention in the following specification and have illustrated it in the accompanying drawings, in which:

Figure 1 is a side elevation of the power unit, shown in conjunction with a brake shoe that is shown in section;

Fig. 2 is a horizontal transverse section on the line 2—2 of Fig. 1;

Fig. 3 is a transverse section on the line 3—3 of Fig. 2;

Fig. 4 is an end elevation of Fig. 2 as viewed from the left;

Fig. 5 is a transverse section on line 5—5 of Fig. 2;

Fig. 6 is a detailed view of a modified form of plunger;

Figure 7:
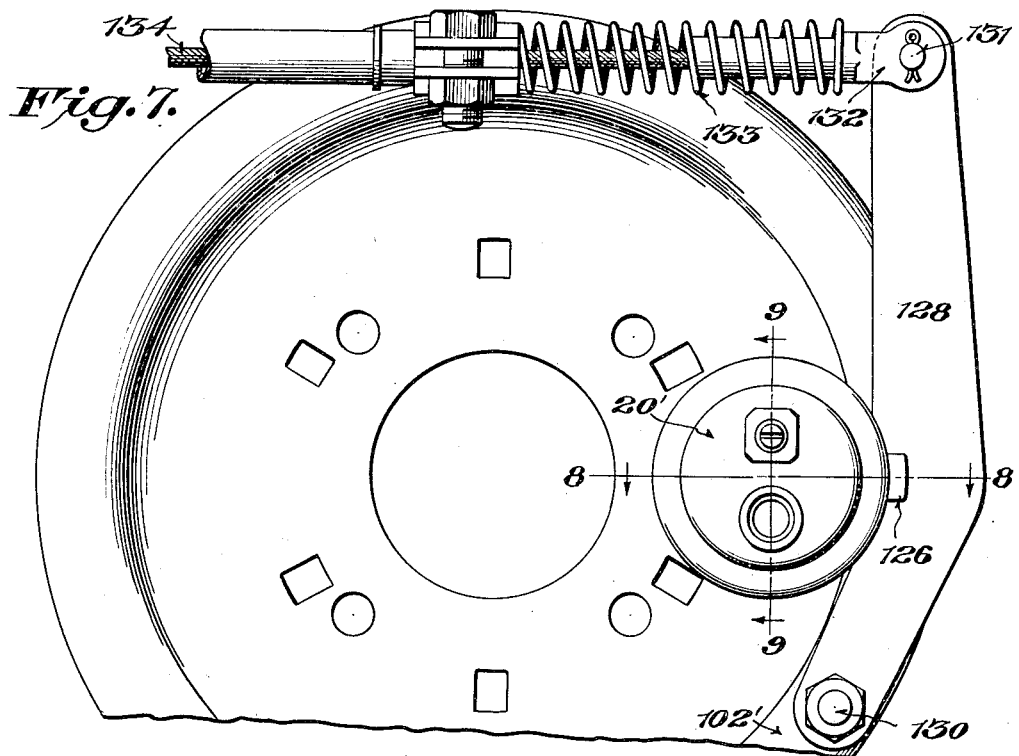
Fig. 7 is a vertical elevation of a brake with a slightly modified form of power unit attached thereto that is particularly adapted for use on rear wheels with a hand brake, such as an emergency brake, connected thereto.

Referring to the accompanying drawings, and particularly to Figs. 1-5 thereof, my improved power unit 20 preferably comprises a fluid cylinder 21, a piston cylinder 22, a resilient seal 23, a piston 24, and a piston rod 25.

As best shown in Fig. 2, fluid cylinder 21 and piston cylinder 22 are cup-shaped members terminating in circumferential flanges 26 and 27, respectively, between which a flange 28 on the rubber seal 23 and a spacer ring 30 are securely held by a clamping ring 31, which is securely clamped therearound by any convenient means, as a power press (not shown).

Resilient seal 23 is preformed and is resistant to oils. It is made of any suitable material, such as neoprene, buna rubber, or thiokol. As shown, it comprises a bottom portion 32 which is flat, side wall 33 at right angles thereto, and the aforementioned flange 28 which extends at right angles to the side wall 33 and terminates in a secondary flange 34 that is parallel to the side wall 33 but spaced therefrom.

The piston 24 comprises a head 35 and a circumferential flange 36 at right angles thereto. The head 35 and flange 36 are made just sufficiently smaller than the resilient seal 23 to permit the piston 24 to be inserted in the resilient seal without deforming it, and the internal diameter of the spacer ring 30 is only sufficiently larger than the diameter of the piston 24 to permit its moving freely therethrough.

Piston cylinder 22 comprises a bottom portion 37, which is flat but is provided with an orifice 38, for a purpose to be described later, and a side wall 40, whose internal diameter is equal to the internal diameter of the side wall 33 of resilient seal 23, and which is only sufficiently larger than the external diameter of the flange 36 on piston 24 to permit it to move freely therethrough. Side wall 40 terminates in the flange 27 described above, and this, in turn, is provided with a right angular extension 41, which is parallel to the side wall 40 and of a suitable internal diameter such that it just accommodates spacer ring 30 and flange 34 of resilient seal 23.

Fluid cylinder 21 comprises a bottom portion 42 provided with a side wall 43 that is of just sufficient internal diameter to allow the side wall 33 of resilient seal 23 to fit therein without deformation. This construction in conjunction with the closely fitting circumferential flange 36 of piston 24 prevents lateral pressure on the side wall 33 of the resilient seal 23. Side wall 43 terminates in flange 26 discussed above.

Bottom portion 42 is provided with two bosses 50, 54 that are preferably formed integral therewith. Boss 50 is internally threaded at 51 to receive any suitable coupling (not shown), and is provided with an orifice 52 to permit fluid (not shown) to enter a chamber 53 formed in fluid cylinder 21 between its bottom portion 42 and the resilient seal 23. Boss 54 is preferably internally threaded to receive a correspondingly threaded bleeder plug 55, provided with a square head 56. Bleeder plug 55 communicates with the exterior through a longitudinal orifice (not shown) that communicates with a transverse orifice 57, in a shank 58 of reduced diameter. Orifice 57 can communicate with a transverse orifice 60 in bottom portion 42 of fluid cylinder 21, and thence with the chamber 53 when the bleeder plug 55 is partially unscrewed from its seat 61. This may conveniently be done with a screw driver by inserting the latter in a transverse slot 62 in the head of the bleeder plug 55.

Piston rod 25 is provided with a flat head 70 and a stem 71. The latter preferably has a detachable plunger 72 which terminates in a tapered head 73, for a purpose to be described later, and with a shank 74 of reduced diameter that is telescoped into the end of stem 71 and retained therein by a removable pin 75.

Piston rod 25 operates in and is guided by a power head 76 that has a longitudinal aperture 77 of just sufficiently larger internal diameter than stem 71 and plunger 72 of piston rod 25 to allow these to move therein without undue friction. Power head 76 is preferably a screw machine part that is externally threaded at 78 to receive two locknuts 80, 81, to retain the piston cylinder 22 properly spaced from the mechanism which the power unit is intended to operate.

The travel of piston rod 25 is preferably controlled by a spacer 84, provided with an external flange 85, whose external diameter corresponds to the internal diameter of the side wall 40 of piston cylinder 22, and with an orifice 86 that is of large enough diameter to permit the stem 71 of piston rod 25 to move therethrough without undue friction. A spacer sleeve 87, that is of sufficiently smaller external diameter to fit snugly in spacer 84, and of larger internal diameter than the orifice 86, is designed to retain a stop pin 88, carried by the stem 71 of piston rod 25 but projecting therebeyond, so as to limit the travel of the piston rod 25 between the spacer 84 and the inner end of power head 76. Spacer sleeve 87 is preferably separate from the threaded portion 78 of power head 76. Spacer 84 is also internally threaded to engage the inner threaded end 78 of power head 76.

A heavy coil spring 90 is telescoped around spacer 84, and bears against the flange 85 thereof and against the head 70 of piston rod 25, to normally force the latter into engagement with piston 24 and cause that to bear against resilient bottom portion 32 of resilient seal 23, but spring 90 is of insufficient power to stretch the resilient seal. The latter is free of either compression or distention when it is in normal position.

An important use of my invention is to operate vehicle brakes, and I have therefore illustrated such a use in Figs. 1-5. In these, as best shown in Figs. 1-3, the brake comprises brake shoes 100, 101, a backing plate 102, and a retaining spring 103. The ends of brake shoes 100, 101 are preferably recessed at 104 to receive the power head 76, and at 105 to receive hardened steel inserts 106 for a purpose to be described hereinafter.

Power head 76 is locked into the backing plate 102 by a key 107, and lock nut 81 is drawn up against backing plate 102 to hold the latter tightly against a shoulder 108 on the power head. The latter is preferably provided with a recessed portion 110 to receive flange portions 111 on the brake shoes 100, 101.

When fluid enters chamber 53 in fluid cylinder 21 through the orifice 52, it bears against the bottom portion 32 of resilient seal 23 and moves piston 24 and piston rod 25 forward, against the pressure of spring 90. This causes the tapered head 73 of the plunger 72 to spread apart two steel balls 112 which, in turn, bear against the hardened steel inserts 106, and thus spread the ends of the brake shoes 100, 101 apart to apply the brake. Steel balls 112 are housed in a transverse recess 113 in power head 76, and the recesses 104 in the ends of the brake shoes are of just sufficient size to receive the head of power head 76 and the steel balls 112 in the desired inactive position of the brake shoes, which is normally maintained with the aid of spring 103.

It will be obvious that the amount of braking power for a given movement of the piston rod is determined by the angle of the tapered head 73 on plunger 72. In the form shown in Fig. 2, the sides of the tapered head 73 each preferably make approximately a 20 degree angle with the axis of the piston rod 25. Such a construction produces a softer and lower pedal and more braking power with a given movement of the piston rod 25.

In Fig. 6, I have shown a modified form of plunger 72', with a tapered head 73' and a reduced diameter shank 74'. The sides of the tapered head 73' each make a greater angle with the axis of the piston rod, as for example, 30 degrees. This gives a harder and higher pedal and less braking power with the same brake applying pressure. By merely removing the pin 75, plunger 72' may be substituted for plunger 72. Similarly, the angle formed by the sides of the tapered head may be made any desired one to give any desired relation between power and given brake applying pressure.

Figure 8:
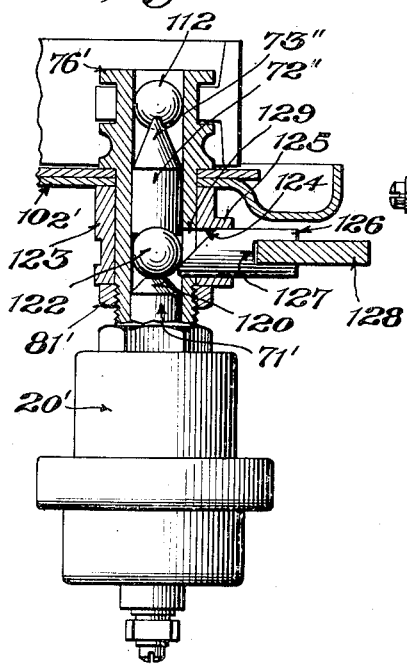
Fig. 8 is a horizontal section on the line 8—8 of Fig. 7.
Figure 9:
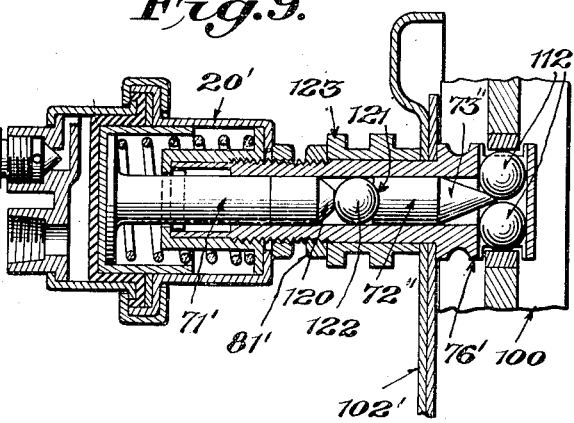
Fig. 9 is a vertical section on the line 9—9 of Fig. 7.

In Figs. 7, 8, and 9, I have shown a slightly modified power unit 20', nearly all of the parts of which are the same as the parts of the power unit 20 shown in Figs. 1-5. However, the stem 71', shown in Figs. 8 and 9, differs from the stem 71, shown in Fig. 2, by terminating in a tapered head 120, and the plunger 72" differs from plunger 72 in that it has no projecting shank 74 and is provided with a circular recess 121, to receive a hardened steel ball 122 that is interposed between plunger 72" and the tapered head 120 on stem 71'. As shown in Figs. 8 and 9, the tapered head 120 is flat, or slightly recessed, at its forward end for engagement with the hardened steel ball 122.

Another change comprises the provision of a sleeve 123 that is interposed between lock nut 81' and the backing plate 102'. Sleeve 123 is provided with a lateral aperture 124, registering with an aperture 129 in power head 76'. Sleeve 123 also has a guide flange 125 for a diagonally-headed operating rod 126, that is adapted to bear against steel ball 122 and force it forward, thus propelling plunger 72" independently of any hydraulic actuation and causing it to apply the brake when its tapered head 73" engages steel balls 112. Operating rod 126 is bifurcated at 127 to receive an operating lever 128, which is preferably pivoted at 130 to the backing plate 102' of the brake. At its opposite end, operating lever 128 is pivotally connected at 131 to an operating rod 132 forming part of the emergency brake. The latter is preferably provided with a coil spring 133 that normally bears against operating rod 132 to maintain the emergency brake in the "off" position. The emergency brake is applied by pulling the operating cable 134 in the usual way.

From the above description, it will be seen that my new power unit is of simple and inexpensive construction and comprises a minimum of parts. Furthermore, since the power unit is sealed at the time it is made, it will thereafter continue to remain free from dirt and grit, which is one of the common causes for failure of conventional types of piston, cup and cylinder hydraulic mechanisms.

Among the other outstanding advantages of my new power unit is the fact that it is mounted outside of the brake cavity. This prevents the unit from getting gas-lock, which often happens with prior constructions because the heat developed by the brakes gasifies the fluid with a resultant total loss of braking power. Furthermore, while my improved power unit is so designed that it is not believed any fluid can leak by the resilient seal, nevertheless, if a leak should occur for any reason, it would not affect the brake inasmuch as the fluid would drop outside of the brake cavity and would not touch the brake lining.

A further highly important advantage of my new power unit is that it could be replaced, should this ever become necessary, without even removing a wheel from the vehicle, since it can be unscrewed from the outside.

Although I have herein disclosed my power unit as being adapted for the operation of brakes, it will be obvious that it may be used for many other purposes, such as the operation of the flaps of an airplane or autogiro, and for any other device to which it is desired to transmit motive power.

It will therefore be apparent that I have developed a new and highly useful power unit which is capable of general application and may be operated selectively, either hydraulically or mechanically.

As many apparently widely different embodiments of this invention may be made without departing from the spirit thereof, it is understood that I do not limit myself to the foregoing embodiments or description except as indicated in the following claims.

I claim:

1. A self-contained power unit comprising a fluid cylinder, a piston cylinder, a resilient seal interposed between these two cylinders and comprising a bottom portion whose area is equal to the internal cross-section of the fluid cylinder, a continuous side wall in contact with the inner wall of the fluid cylinder, and a projecting flange for clamping between adjacent portions of the fluid cylinder and piston cylinder, and a piston actuated by movements of the resilient seal, the piston comprising an end portion and a continuous side wall, the latter fitting snugly within the side wall of the resilient seal and the bottom portion of the piston conforming to and supporting the bottom portion of the resilient seal, the piston also having a piston rod with a tapered end projecting beyond the piston cylinder and a pair of thrust-imparting metal balls actuated by said tapered end.

2. A self-contained power unit comprising a fluid cylinder, a piston cylinder, a resilient seal interposed between these two cylinders and comprising a bottom portion whose area is equal to the internal cross-section of the fluid cylinder, a continuous side wall in contact with the inner wall of the fluid cylinder, and a projecting flange for clamping between adjacent portions of the fluid cylinder and piston cylinder, and a piston actuated by movements of the resilient seal, the piston comprising an end portion and a continuous side wall, the latter fitting snugly within the side wall of the resilient seal and the bottom portion of the piston conforming to and supporting the bottom portion of the resilient seal, the piston also having a piston rod with a tapered end projecting beyond the piston cylinder, a pair of thrust-imparting metal balls actuated by said tapered end, and means for limiting the travel of the piston.

3. A self-contained power unit comprising a fluid cylinder, a piston cylinder, a resilient seal interposed between these two cylinders and comprising a bottom portion whose area is equal to the internal cross-section of the fluid cylinder, a continuous side wall in contact with the inner wall of the fluid cylinder, and a projecting flange for clamping between adjacent portions of the fluid cylinder and piston cylinder, and a piston actuated by movements of the resilient seal, the piston comprising an end portion and a continuous side wall, the latter fitting snugly within the side wall of the resilient seal and the bottom portion of the piston conforming to and supporting the bottom portion of the resilient seal, the piston also having a piston rod with a tapered end projecting beyond the piston cylinder, a pair of thrust-imparting metal balls actuated by said tapered end, and means for changing the thrust imparted by the tapered end for a given movement of the piston.

4. A self-contained power unit comprising a fluid cylinder, a piston cylinder, a resilient seal interposed between these two cylinders and comprising a bottom portion whose area is equal to the internal cross-section of the fluid cylinder, a continuous side wall in contact with the inner wall of the fluid cylinder, and a projecting flange for clamping between adjacent portions of the fluid cylinder and piston cylinder, and a piston actuated by movements of the resilient seal, the piston comprising an end portion and a continuous side wall, the latter fitting snugly within the side wall of the resilient seal and the bottom portion of the piston conforming to and supporting the bottom portion of the resilient seal, the piston also having a piston rod with a tapered end projecting beyond the piston cylinder, and a pair of thrust-imparting metal balls actuated by said tapered end, the tapered end being removable to substitute an end having a different taper.

5. A power unit provided with a cup-shaped resilient seal at an intermediate zone, a piston adapted to continuously support said resilient seal, a fluid chamber to impart pressure against said resilient seal for actuation of the piston, and means for actuating said power unit independently of said fluid means.

6. In a brake mechanism, the combination of brake shoes and a power unit for actuating them, said power unit comprising a fluid actuated piston terminating in a tapered piston rod, a tubular power head surrounding said piston rod, and a pair of hardened metal inserts mounted in a transverse aperture in said power head, whereby movement of said piston rod separates said metal inserts and actuates the brake shoes.

JESSE G. HAWLEY.